United States Patent [19]

Crutchfield et al.

[11] 4,201,858

[45] May 6, 1980

[54] METHOD OF PREPARING POLYACETAL CARBOXYLATES

[75] Inventors: Marvin M. Crutchfield, St. Louis; Charles J. Upton, Ballwin, both of Mo.

[73] Assignee: Monsanto Company, St. Louis, Mo.

[21] Appl. No.: 967,922

[22] Filed: Dec. 11, 1978

Related U.S. Application Data

[63] Continuation-in-part of Ser. No. 926,683, Jul. 21, 1978, which is a continuation of Ser. No. 844,566, Nov. 21, 1977, abandoned.

[51] Int. Cl.$^2$ .......................... C08G 2/14; C08G 2/36
[52] U.S. Cl. ..................................... 528/232; 528/239; 528/245
[58] Field of Search .................. 252/DIG. 2; 528/232, 528/239, 245

[56] References Cited

U.S. PATENT DOCUMENTS 3,395,125  7/1968  Moyer ................................ 528/245

OTHER PUBLICATIONS

Achmatowicz et al., Chemii Ann. Soc. Chim. Polonorum, vol. 42, p. 453 (1968).

*Primary Examiner*—Lucille M. Phynes
*Attorney, Agent, or Firm*—S. M. Tarter; E. P. Grattan; F. D. Shearin

[57] ABSTRACT

Ether and acetal carboxylates useful as detergent builders to replace sodium tripolyphosphate (STP) in detergent formulations are known to the art. Certain polymeric polycarboxylates are also known to the art but all of these products suffer from either having poor builder properties or they are not readily biodegradable. According to the present invention, a method is provided for preparing new and novel polymeric acetal carboxylates which are stable under laundry use conditions, but depolymerize in acid media, making the polymer fragments more readily biodegradable in waste streams.

15 Claims, No Drawings

METHOD OF PREPARING POLYACETAL CARBOXYLATES

CROSS REFERENCES TO RELATED APPLICATIONS

This application is a continuation-in-part of application Ser. No. 926,683 filed July 21, 1978 which is a continuation of application Ser. No. 844,566 filed Nov. 21, 1977, and now abandoned.

BACKGROUND OF THE INVENTION

This invention relates to a method for preparing novel polymeric acetal carboxylates useful as complexing agents and detergency builders.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STP) has been found to be a highly efficient cleaning and detergent builder and this compound has been widely used for decades in cleaning and detergent formulations. Indeed, millions of pounds of STP are used each year in cleansing formulations because of its superior builder qualities. However, because of the recent emphasis on removing phosphates from detergent and cleaning compositions for environmental reasons, the detergent and cleaning industry is now looking for materials suitable for use as builders which do not contain phosphorus, and which are environmentally acceptable.

A large number of materials which do not contain phosphorus have been evaluated for use in detergent and cleaning formulations as a builder, but all of these materials suffer one or more disadvantages, usually either poor builder properties or poor biodegradability. As an example, U.S. Pat. No. 3,692,685 discloses salts of oxydisuccinic acid and carboxymethyl oxysuccinic acid as detergent builders and U.S. Pat. No. 3,708,436 discloses a mixture of polymeric maleic anhydride with sodium nitrilotriacetate or STP. Numerous U.S. Patents, such as U.S. Pat. No. 3,704,320, disclose ether carboxylates as detergency builders and several references, such as U.S. Pat. No. 3,764,586 and U.S. Pat. No. 3,308,067, disclose polymeric, aliphatic polycarboxylic acids having certain specific structural relationships useful as builders.

Despite the advances taught in these and other references in the prior art to find a cleaning and detergency builder which does not contain phosphorus, all of these materials suffer from one or more disadvantages. Of the above-mentioned materials, those that are biodegradable are not equivalent to STP in builder performance, and of those that are equivalent to STP in builder performance, they are usually biodegradable only with great difficulty. Inorganic builders other than STP are generally not satisfactory for use as a builder in detergent formulations because of their poor builder properties. Sodium aluminum silicates, commonly known as zeolites, have been proposed for use in detergent formulations since they are able to soften water by removing calcium ions; however, they are not very effective in removing magnesium ions from water. Moreover, it is clear that such water-insoluble, clay-like materials have the potential problem of producing a sediment in the cleaning solution and the resulting waste waters. Thus, it can be seen that there is a need for a new class of materials with builder properties equivalent to STP, which does not contain phosphorus, which is water-soluble, and which achieve environmental acceptability by being readily biodegradable.

In copending application Ser. No. 826,424; application Ser. No. 826,425 and application Ser. No. 826,426 filed Aug. 22, 1977 by Crutchfield, Papanu and Warren, methods of preparing polyacetal carboxylates are described wherein an ester of glyoxylic acid is brought together with a polymerization initiator, and thereafter, the resulting polymer is stabilized against rapid depolymerization in alkaline solution. Although satisfactory results are obtained by the above procedure, the present invention provides a method in which the initiator stabilizes a portion of the chain ends of the resulting polymer against rapid depolymerization in alkaline solution.

SUMMARY OF THE INVENTION

Broadly described, the acetal carboxylate polymers can be prepared by bringing together under polymerization conditions an ester of glyoxylic acid and a polymerization initiator that will stabilize one end of up to 100 percent of the chains in the resulting polymer against rapid depolymerization in alkaline solution. To form the polymer salt, the remaining ends are stabilized and the stabilized polymer can be saponified.

For the purposes of this invention, the term "rapid depolymerization in alkaline solution" as it is used in the specification and claims shall mean that in an aqueous solution of 0.5 molar sodium hydroxide containing 10 grams per liter of acetal carboxylate polymer, the average chain length of the acetal carboxylate polymer will be reduced by more than 50 percent, as determined by Proton Magnetic Resonance (PMR), after 1 hour at 20° C.

Any number of esters of glyoxylic acid can be used to prepare the polymers of the present invention. Such esters can be made by the reaction of an alcohol containing from 1 to 4 carbon atoms with glyoxylic acid hydrate under conditions known to those skilled in the art. Thereafter, the resulting ester hemiacetal can be converted to the corresponding aldehyde ester by any number of techniques known to those skilled in the art, such as the reaction of the ester hemiacetal with phosphorus pentoxide. The product of the above reaction is then polymerized using a polymerization initiator of the present invention in accordance with the following general equation:

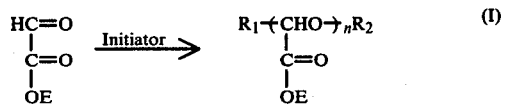

where E is an alkyl group having 1 to 4 carbon atoms, n averages at least 4, and $R_1$ and $R_2$ are end groups. In up to 100 percent of the polymer chains, either $R_1$ or $R_2$ is derived from the initiator, and is of such structure to stabilize that end of the polymer against rapid depolymerization in alkaline solution.

The remaining unstabilized ends of the resulting polymer can be reacted with a reagent which produces a chemically stable end group to stabilize the polymer against rapid depolymerization in alkaline solution. The polymer, stabilized at both ends, is then saponified with a base, such as lithium hydroxide, sodium hydroxide or potassium hydroxide, to make a salt suitable for use as a builder and as a sequestrant. The ammonium, alkanol ammmonium and tetra-alkyl ammonium salts can be prepared from the alkali metal salts using conventional ion exchange techniques.

The glyoxylic acid can be converted to the ester by reaction with any number of alcohols, such as methanol, ethanol, propanol, isopropanol and the like. It is only necessary that the ester group does not interfere with the subsequent polymerization. Methanol is preferred.

Any number of metal derivatives, such as magnesium or the alkali metals, i.e., sodium, potassium or lithium, derivatives can be used to initiate the reaction, and to add the chemically stable group to one end of some or all of the polymer chains to stabilize that end of the polymer against rapid depolymerization in alkaline solution. The specific nature of the end group is not important in the proper function of the polymer as a builder, but it is preferred to provide end groups containing oxygen, and even more preferred to provide end groups containing carboxylate groups. As will occur to those skilled in the art in light of the present disclosure, the initiators of the present invention can be prepared by a number of techniques, such as reacting an alkali metal hydride in a solvent, e.g., tetrahydrofuran, with a compound that will form the corresponding initiator. Magnesium compounds, such as Grignard reagents, are effective. Particularly suitable initiators include the lithio, sodio or potassio derivatives of alcohols, such as methanol, ethanol, propanol, cyclohexanol, phenol, alkyl substituted phenol and the like; and especially esters of carboxylic acids such as acetates, adipates, butyrates, caprates, citrates, lactates, malates, malonates, salicylates, succinates, tartrates and the like. Initiators such as dialkyl sodiomalonate and dialkyl sodiomethylmalonate are especially preferred.

Any number of groups can be added to the unstabilized ends of the polymer to stabilize the polymer against rapid hydrolysis in an alkaline solution. As an example, moieties that provide suitable chemically stable end groups include: alkyl groups, such as methyl, ethyl, tertiary butyl and the like. Other suitable end groups include groups containing oxygen, such as carboxylic acids like —$CH_2COOR$,

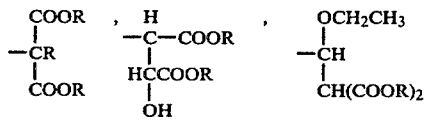

and the like; alcohols, ethers and other oxygen-containing groups such as —$CH_2CH_2OH$,

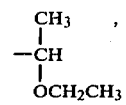

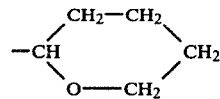

and the like. In the above examples of suitable end groups, R is hydrogen or alkyl group of 1 to 8 carbon atoms. As will occur to those skilled in the art in light of the present disclosure, the groups at the polymer termini can be alike or unlike.

The number of repeating units, i.e., the average value of n, in the polymer of the present invention is important since the effectiveness of the polymer as a chelant, sequestrant and cleaning and detergency builder is affected by the average chain length. Even when the polymer averages four repeating units (i.e., n averages 4), the polymer shows some effectiveness as a sequestrant, chelating agent and builder. Although there is no upper limit to the desired number of repeating units, which may average as high as 400, or even higher, there does not seem to be an advantage to having a polymer with an average of more than about 200 repeating units. When the average number of repeating units exceeds about 100, significant improvement in sequestration, chelation and builder properties is not observed. Thus, it is preferred that the polymer made by the present process contain an average between about 10 and about 200 units, and even more preferred that the polymer contains an average between about 50 and about 100 repeating units in the polymer chain.

Important factors believed to control the chain length include (1) the initiator concentration, (2) the temperature of the polymerization, (3) the purity of the starting materials, and (4) the presence of solvents and their levels. As will occur to those skilled in the art, the concentration of the initiator, solvents and their levels, and the temperature of the polymerization reaction are all interrelated and the desired chain length can easily be controlled by simple experimentation by controlling these variables. Generally speaking, the lower the temperature at the beginning of the polymerization, the higher the chain length.

The concentration of the initiator in the process of the present invention can vary within wide limits. For example, to prepare a polymer having an average chain length of 50 repeating units wherein about 10 percent of the polymer chains are stabilized at one end by the initiator, the mole ratio of monomer to initiator can be about 500:1. Higher or lower mole ratios can be used, which will affect the chain length, but will also affect the number of polymer chains that are endcapped at one end. Generally, at least 1 percent of the polymer chains are stabilized at one end by the initiator according to the present process, and as will occur to those skilled in the art in light of the present disclosure, virtually all of the polymer chains can be stabilized at one end by the initiator by carefully controlling the polymerization conditions. However, a satisfactory polymer can be prepared when from about 3 percent to about 25 percent of the polymer chains are stabilized at one end by the initiator, and this is what we prefer to do.

By the method of the present invention, the polymer ester can be converted to the corresponding alkali metal, ammonium, alkanol ammonium or tetra-alkyl ammonium salts by conventional techniques.

The salts are useful as agents for complexing metals and/or alkaline earth ions in aqueous media. The amount of salt required to effectively complex the ions in a given system will depend to some extent on the particular salt being used and the particular metal or alkaline earth metal ion in the aqueous media. Because the polymer of the present invention tends to depolymerize in acid media, effective complexing is limited to neutral or preferably basic solution. Optimum conditions and amounts of the polymer salt to be used can readily be determined by routine experimentation.

The polymer salts of the present invention are also useful as builders in detergent formulations. Since the pH of a detergent solution is usually between pH 9 and pH 10, the polymer of the present invention will not depolymerize rapidly when used as a detergent builder in aqueous solution at normal use concentrations, temperatures and times typical of U.S. home laundry practices. Generally, the use of the alkali metal salts, particularly the sodium salt, is preferred. However, in some formulations where greater builder solubility is required, the use of ammonium or alkanol ammonium salts may be desirable.

The detergent formulations will contain at least 1 percent by weight and preferably at least 5 percent by weight of the polymer salt. In order to obtain the maximum advantages of the polymer salts as builders, the detergent should preferably contain from about 5 percent to about 75 percent of these salts. The polymer salts can be the sole detergency builder, or these polymer salts can be utilized in combination with other detergency builders which may constitute from 0 to 95 percent by weight of the total builders in the formulation. By way of example, builders which can be employed in combination with the polymer salts include either water insoluble materials, such as sodium aluminosilicates, commonly known as zeolites, or water soluble inorganic builder salts such as alkali metal polyphosphates, i.e., the tripolyphosphates and pyrophosphates, alkali metal carbonates, borates, bicarbonates and silicates and water soluble organic builders including amino polycarboxylic acids and salts, such as alkali metal nitrilotriacetates, cycloalkane, polycarboxylic acids and salts, ether polycarboxylates, alkyl polycarboxylates, epoxy polycarboxylates, tetrahydrofuran polycarboxylates, such as 1,2,3,4 or 2,2,5,5 tetrahydrofuran tetracarboxylates, benzene polycarboxylates, oxidized starches, amino(trimethylene phosphonic acid) salts, diphosphonic acid salts (e.g., the sodium salts of methylene diphosphonic acid or 1-hydroxy ethylidene 1,1-dimethylenephosphonic acid), and the like.

The detergent formulations will generally contain from 5 percent to 95 percent by weight total builder (although greater or lesser quantities may be employed if desired). The total amount of builder employed will be dependent on the intended use of the detergent formulation, other ingredients of the formulation, pH conditions and the like. For example, general laundry powder formulations will usually contain from about 20 percent to about 60 percent builder; and machine dishwashing formulations will usually contain from about 60 percent to about 90 percent builder. Optimum levels of builder content as well as optimum mixtures of builders of this invention with other builders for various uses can be determined by routine tests in accordance with conventional detergent formulation practice.

The detergent formulations will generally contain a water soluble detergent surfactant, although the surfactant ingredient may be omitted from machine dishwashing formulations. Any water soluble anionic, nonionic, zwitterionic or amphoteric surfactant can be employed.

Examples of suitable anionic surfactants include soaps such as the salts of fatty acids containing about 9 to 20 carbon atoms, e.g., salts of fatty acids derived from coconut oil and tallow; alkylbenzene sulfonates—particularly linear alkylbenzene sulfonates in which the alkyl group contains from 10 to 16 carbon atoms; alcohol sulfates; ethoxylated alcohol sulfates, hydroxy alkyl sulfonates; alkyl sulfates and sulfonates, monoglyceride sulfates; acid condensates of fatty acid chlorides with hydroxy alkyl sulfonates and the like.

Examples of suitable nonionic surfactants include alkylene oxide (e.g., ethylene oxide) condensates of mono- and polyhydroxy alcohols, alkyl phenols, fatty acid amides and fatty amines; amine oxides; sugar derivatives such as sucrose monopalmitate; long chain tertiary phosphine oxides; dialkyl sulfoxides; fatty acid amides, (e.g., mono- or diethanol amides of fatty acids containing 10 to 18 carbon atoms); and the like.

Examples of suitable zwitterionic surfactants include derivatives of aliphatic quaternary ammonium compounds such as 3-(N,N-dimethyl-N-hexadecylammonio) propane-1-sulfonate and 3-(N,N-dimethyl-N-hexadecylammonio)-2-hydroxy propane-1-sulfonate.

Examples of suitable amphoteric surfactants include betains, sulfobetains, and fatty acid imidazole carboxylates and sulfonates.

It will be understood that the above examples of surfactants are by no means comprehensive and that numerous other surfactants are known to those skilled in the art. It will be further understood that the choice and use of surfactants will be in accordance with well understood practices of detergent formulation. For example, anionic surfactants, particularly linear alkylbenzene sulfonate, are preferred for use in general laundry formulations, whereas low foaming nonionic surfactants are preferred for use in machine dishwashing formulations.

The quantity of surfactant employed in the detergent formulations will depend on the surfactant chosen and the end use of the formulation. In general, the formulations will contain from 5 percent to 50 percent surfactant by weight, although as much as 95 percent or more surfactant may be employed if desired. For example, general laundry powder formulations normally contain 5 percent to 50 percent, preferably 15 percent to 25 percent surfactant. Machine dishwashing formulations normally contain about 0.5 percent to about 5 percent surfactant. Liquid dishwashing formulations normally contain about 20 percent to about 45 percent surfactant. The weight ratio of surfactant to builder will generally be in the range of from 1:12 to 2:1.

In addition to builder and surfactant components, detergent formulations may contain fillers such as sodium sulfate and minor amounts of bleaches, dyes, optical brighteners, soil antiredeposition agents, perfumes and the like.

In machine dishwashing compositions, the surfactant will be a low-foaming nonionic surfactant which will constitute 0 to 5 percent of the formulation.

It is to be noted that when the alkali metal, ammonium or alkanol ammonium salts of the present invention are used as builders, they will be used generally in an alkaline medium. When the compositions of the present invention are used at a pH of 7 or below, the composition depolymerizes. Thus, it can be seen that the compositions prepared according to the process of the present invention when used as builders will be effective for chelating, sequestering and as detergency and cleaning builders, but when an aqueous solution containing the composition is discharged into a sewer or other waste water system, the composition will soon depolymerize into small fragments which are readily biodegradable.

DESCRIPTION OF THE PREFERRED EMBODIMENTS

This invention is illustrated by, but not limited to, the following Examples wherein all percentages are by weight unless otherwise noted.

EXAMPLE I

To a 50 milliliter single-necked, round-bottomed reaction flask equipped with a magnetic stirrer was added 10 grams (0.114 mole) of freshly distilled methyl glyoxylate and 4 milliliters of methylene chloride. The temperature of the flask and the contents was lowered to about 0° C., and 0.5 milliliters of 0.5 molar sodium diethyl methylmalonate was added to initiate polymerization. The flask was kept in an ice bath, and when the temperature returned to 0°–2° C., (about 45 minutes) 0.18 milliliter trifluoroacetic acid (1.5 mole percent) and 3.5 milliliters of ethyl vinyl ether was added to the mixture. The mixture was stirred at room temperature overnight. About 2 milliliters of 1 molar NaOH solution was added to the mixture and the volatiles were removed under vacuum. Then 12 mililiters of 2.5 molar NaOH were added. The mixture was stirred at about 0° C. for about 5 hours and then heated to about 40° C. for about 24 hours. The methanol and residual solvents were removed by rotary evaporation. The solution was concentrated to about 15 percent, precipitated in about 100 milliliters of methanol and stirred for 30 minutes. The precipitate was recovered by filtration and dried. The precipitate was then redissolved in distilled water, precipitated into methanol, stirred and recovered by filtration. The yield was about 74.8 percent. Analysis of the product, including the chain length, by Proton Magnetic Resonance (PMR) Spectra Analysis, showed that the product was a mixture containing a minor amount (i.e., about 8 percent) of a polymer wherein one end of the polymer was stabilized by an end group derived from the initiator

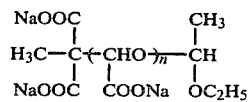

and a major amount of

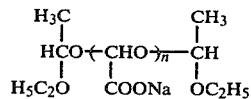

where n averages about 40.

EXAMPLES II THROUGH IV

The procedure of Example I was repeated except that the temperature of initiation was varied. The result of this variation of the temperature of initiation on the chain length as determined by the average value of n is shown in the following tabulation:

| Example | Temperature of Initiation (° C.) | n |
|---|---|---|
| 2 | −70 | 60 |
| 3 | −20 | 55 |
| 4 | 20 | 20 |

EXAMPLE V

The procedure of Example I was repeated except different initiation temperatures were used to provide a series of samples having different chain lengths, as measured by PMR. These samples were tested for sequestration function using the procedures described by Matzner et al ("Organic Builder Salts as Replacements for Sodium Tripolyphosphate" TENSIDE DETERGENTS, 10 No. 3, pages 119-125) 1973. The sequestration of calcium ions and magnesium ions (as a percent of STP performance) as a function of chain length is shown below:

| Chain Length (n) | % STP |
|---|---|
| 2 | 37 |
| 20 | 85 |
| 45 | 117 |
| 70 | 126 |
| 130 | 129 |

EXAMPLE VI

The biodegradation of three of the samples from Example V was measured by diluting one part of an activated sewerage sludge with about 10 parts of river water, and adding a known amount of the polymer to the diluted sludge. The biodegradation is determined by measuring the $CO_2$ evolution from the diluted sludge.

The evolution of carbon dioxide was comparable to materials known to be completely biodegradable. The results are presented in the following tabulation:

| Chain Length | $CO_2$ Evolved (% Theory) | | |
|---|---|---|---|
| | 1 Week | 3 Week | 4 Weeks |
| 20 | 9.8 | 59 | 73 |
| 45 | 11.7 | 56 | 67 |
| 120 | 18.5 | 58 | 66 |

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A method which comprises bringing together under polymerization conditions, an ester of glyoxylic acid and a polymerization initiator that will stabilize one end of up to 100 percent of the chains in the resulting polymer against rapid depolymerization in alkaline solution.

2. A method of claim 1 wherein at least 1 percent of the polymer chains are stabilized at one end by the initiator.

3. A method of claim 1 wherein from about 3 percent to about 25 percent of the polymer chains are stabilized at one end by the initiator.

4. A method of claim 1 wherein the polymerization initiator is a lithio, sodio or potassio derivative of an oxygen-containing compound.

5. A method of claim 1 wherein the polymerization initiator is a lithio, sodio or potassio derivative of an alcohol.

6. A method of claim 1 wherein the polymerization initiator is a lithio, sodio or potassio derivative of an ester.

7. A method of claim 6 wherein the ester is selected from the group consisting of acetates, adipates, butyrates, caprates, citrates, lactates, malonates and tartrates.

8. A method of claim 6 wherein the polymerization initiator is dialkylsodiomalonate.

9. A method of claim 6 wherein the polymerization initiator is a dialkyl sodiomethylmalonate.

10. A method of claim 2 wherein there is added to the unstabilized ends of the polymer chains a chemically stable group to stabilize the polymer against rapid depolymerization in alkaline solution.

11. A method of claim 10 wherein the chemically stable group is derived from a moiety selected from the group consisting of —CH$_3$, —C$_2$H$_5$, —CH(CH$_3$)OC$_2$H$_5$,

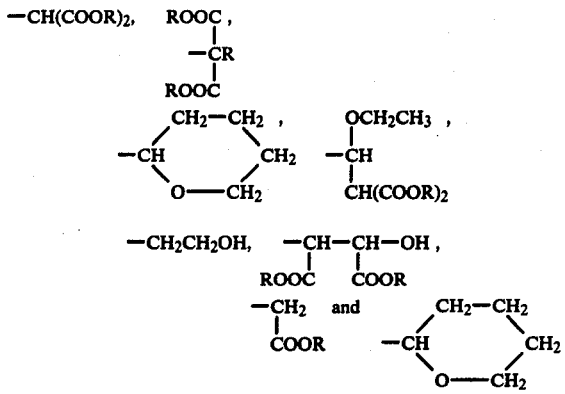

where R is an alkyl group of 1 to 8 carbon atoms.

12. A method of claim 10 wherein there is added to the polymer a moiety having the formula

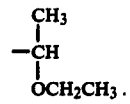

13. A method of claim 10 wherein the stabilized polymer is converted to a polymer salt selected from the group consisting of alkali metal, ammonium or alkanol ammonium salt.

14. A method of claim 13 wherein the stabilized polymer is converted to the alkali metal salt.

15. A method of claim 13 wherein the stabilized polymer is converted to the sodium salt.

* * * * *